(12) United States Patent
Avampato et al.

(10) Patent No.: US 7,185,675 B2
(45) Date of Patent: Mar. 6, 2007

(54) REDUCED GAIN THRUST CONTROL VALVE

(75) Inventors: Tim Joseph Avampato, South Windsor, CT (US); Beth Ellen Tepper, North Palm Beach, FL (US); Antony Bautista, Huntsville, AL (US)

(73) Assignee: United Technologies Corporation, Hartford, CT (US)

( * ) Notice: Subject to any disclaimer, the term of this patent is extended or adjusted under 35 U.S.C. 154(b) by 132 days.

(21) Appl. No.: 10/825,254

(22) Filed: Apr. 15, 2004

(65) Prior Publication Data

US 2006/0278284 A1 Dec. 14, 2006

Related U.S. Application Data

(63) Continuation-in-part of application No. 10/026,322, filed on Dec. 21, 2001, now abandoned.

(51) Int. Cl.
*F16K 3/32* (2006.01)

(52) U.S. Cl. .................. 137/625.3; 60/39.281

(58) Field of Classification Search .......... 137/625.3; 60/39.281, 243
See application file for complete search history.

(56) References Cited

U.S. PATENT DOCUMENTS

| 2,936,557 | A | | 5/1960 | Amnens |
| 3,093,157 | A | | 6/1963 | Aitken et al. |
| 3,426,801 | A | | 2/1969 | Curran |
| 3,752,183 | A | | 8/1973 | Griswold |
| 3,780,531 | A | * | 12/1973 | Blair .................... 60/200.1 |
| 3,803,929 | A | * | 4/1974 | Karol ...................... 74/99 R |
| 4,000,607 | A | * | 1/1977 | Bolliger .................. 60/773 |
| 4,326,377 | A | | 4/1982 | Jaqua |
| 4,834,785 | A | * | 5/1989 | Ayres ..................... 62/650 |
| 6,328,056 | B1 | * | 12/2001 | Kumar et al. ......... 137/115.09 |
| 6,655,151 | B1 | * | 12/2003 | Mahoney et al. ......... 60/773 |
| 6,751,985 | B1 | * | 6/2004 | Kimble et al. ............ 62/613 |

* cited by examiner

*Primary Examiner*—John Fox
(74) *Attorney, Agent, or Firm*—Bachman & LaPointe

(57) ABSTRACT

A reduced gain thrust control valve for use in a rocket engine has a housing with a fluid inlet and a piston and cylinder unit for controlling a fluid output of the control valve. The fluid inlet is formed by at least one metering element formed in the housing. The at least one metering element has a rectangular portion for producing improved control stability, a tee and slot portion for controlling thrust during a start transient engine phase, and a fixed turbine bypass portion for accommodating a retainer. The retainer incorporates at least one fluid channel so as to produce repeatable fixed bypass flow metering.

11 Claims, 2 Drawing Sheets

REDUCED GAIN THRUST CONTROL VALVE

CROSS-REFERENCE TO RELATED APPLICATIONS

This application is a continuation-in-part of U.S. Ser. No. 10/026,322, filed Dec. 21, 2001 now abandoned, to Avampato et al. entitled REDUCED GAIN THRUST CONTROL VALVE.

BACKGROUND OF THE INVENTION

The present invention relates to a reduced gain thrust control valve for use in high powered expander cycle rocket engines.

Existing thrust control valves used in rocket engines exhibit oscillatory characteristics at all operating conditions. Further, they exhibit non-repeatable control of turbine fixed bypass flow metering. Rocket engines utilizing the existing thrust control valves are subject to rejection because of high amplitude control oscillations and increased 1 E vibration levels, and inconsistent results from hardware changes intended to adjust the fixed turbine bypass flow rate.

SUMMARY OF THE INVENTION

Accordingly, it is an object of the present invention to provide an improved reduced gain thrust control valve for use in rocket engines.

It is a further object of the present invention to provide a reduced gain thrust control valve which eliminates control oscillations, reduces 1 E vibration levels, and lessens the severity of internal turbomachinery wear mechanisms.

The foregoing objects are attained by the reduced gain thrust control valve of the present invention.

In accordance with the present invention, a reduced gain thrust control valve for use in a rocket engine broadly comprises a housing having a fluid inlet and a piston and cylinder unit for controlling a fluid output of the control valve within the housing. The fluid inlet comprises at least one metering element formed in the housing. Each metering element comprises a first means for producing improved control stability, second means for controlling thrust during a start transient engine phase, and third means for accommodating a classed retainer.

Other details of the reduced gain thrust control valve of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
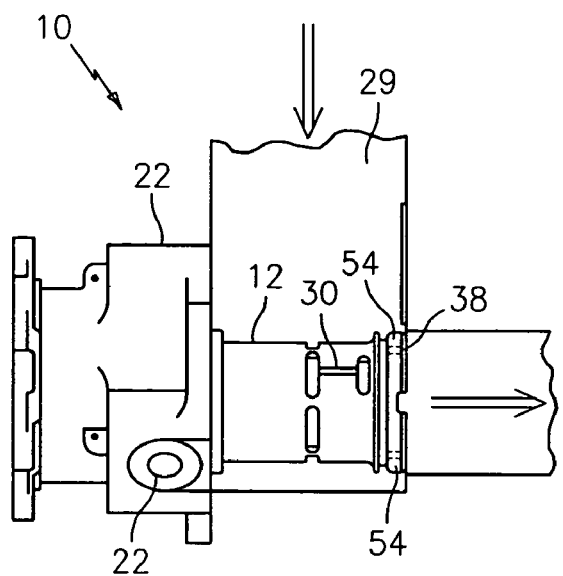
FIG. 1 is a side view of a thrust control valve in accordance with the present invention.
Figure 2:
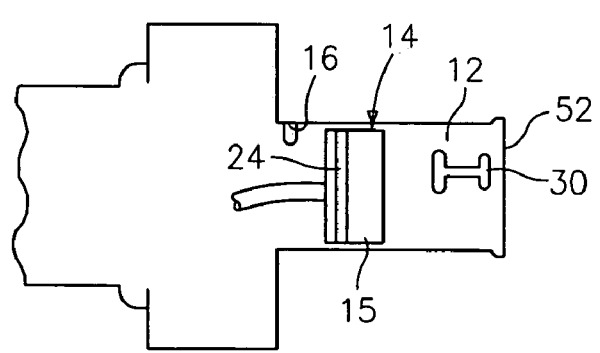
FIG. 2 is a sectional view of the housing of the thrust control valve in accordance with the present invention without the retainer.
Figure 3:
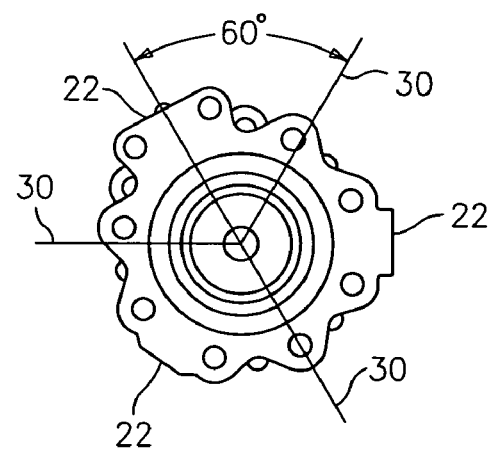
FIG. 3 is an end view of the thrust control valve of the present invention.

Referring now to the drawings, FIGS. 1–3 illustrate a reduced gain thrust control valve 10 in accordance with the present invention. The thrust control valve 10 has a housing 12 and a piston-cylinder unit 14 within the housing 12. The piston-cylinder unit moves as one unit axially along an inside surface 16 of the housing 12. The piston cylinder unit 14 includes a piston 24 and a cylinder 15. The cylinder 15 preferably has a sealed sliding fit within the housing 12.

Referring now to FIGS. 1 and 2, the housing 12 has a plurality of metering elements 30 machined or formed therein. Fluid is supplied to the metering elements 30 via a turbine inlet pressure port 29 which surrounds the housing 12. As the piston and cylinder unit 14 moves axially, it exposes or covers the metering elements 30 depending on engine requirements.

The housing 12 also has a plurality of ports 22 which may be used for instrumentation and the like. As shown in FIG. 3, each metering element 30 is offset from one of the ports 22 by an angle of sixty degrees.

Figure 4:
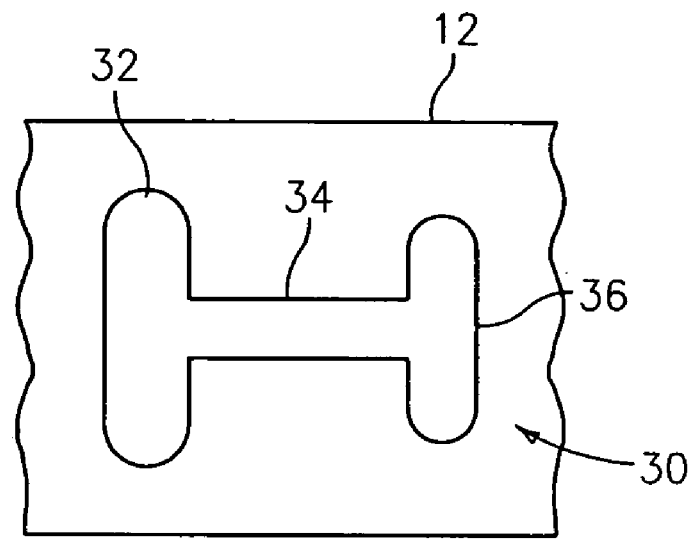
FIG. 4 is a side view of a portion of a housing used in the thrust control valve of FIG. 1 having at least one metering element.

Referring now to FIG. 4, each metering element 30 includes a rectangular portion 32 for producing control stability improvements. The rectangular portion 32 is designed and dimensioned to provide control stability margin and a sufficient steady state operating range for all high powered rocket engine models.

Each metering element 30 further has a tee and slot portion 34. This portion controls thrust during an engine start transient. Still further, each metering element 30 has a fixed turbine bypass portion 36 which accommodates a retainer 38 which has a controlling orifice 40 so as to produce a repeatable fixed bypass flow metering and at least one fluid channel 54 therein. The fluid channel(s) 54 convey fluid to an engine housing port as shown in FIG. 1.

Figure 5:
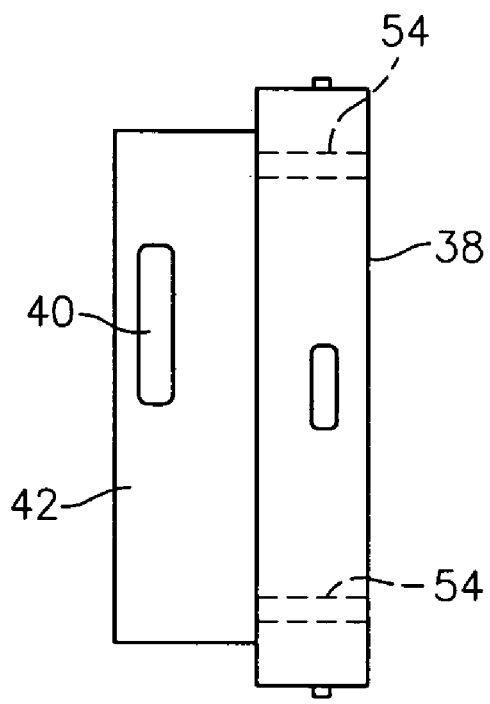
FIG. 5 is a side view of a retainer used in the thrust control valve of FIG. 1.

The retainer 38 used in the thrust control valve 10 is illustrated in FIG. 5. The retainer 38 has a plurality of controlling orifices 40 machined in its side wall 42. The number of controlling orifices 40 present in the retainer 38 is equal to the number of metering elements 30 in the housing 12. Each orifice 40 cooperates with a respective fixed turbine bypass portion 36. The retainer 38 may be secured into the open end 52 of the housing 12 using any suitable means known in the art. For example, the retainer 38 may be secured to the housing 12 using a fixed bayonet approach in which the retainer 38 is spring loaded and twisted into position within the housing 12. Different retainers 38 having different orifices 40 may be used for different types of rocket engines, hence the retainer may be called a classed retainer.

In operation, the piston and cylinder unit 15 is pneumatically actuated and moves between an initial position where it covers each of the metering elements rectangular portions 32 and the tee and slot portion 34, wholly and/or in part. The piston and cylinder unit may then be axially moved to open in whole or in part the tee and slot portion 34 and the rectangular portion 32, depending on the position of the piston and cylinder unit 15. The amount of fluid entering through the metering elements 30 depends on the position of the piston and cylinder unit 15 within the housing 12.

When the valve 10 is opened, it bypasses flow (power) around the turbine (not shown) to which it is attached. When the valve 10 is fully closed, maximum thrust is produced. At 100% power, the position of the piston and cylinder unit 15 is modulated within the vertical rectangle portion of the metering element 30. The rectangular portion 32 of the metering element 30 is only uncovered during startup to provide much more control authority to control this very rapid transient condition. The fixed turbine bypass 36 of metering element 30 is always uncovered and used to compensate for engine to engine variations.

As can be seen from the foregoing description, the thrust control valve of the present invention incorporates a number of metering element features that result in a significant improvement in the operational characteristics and control of high powered expander cycle rocket engines. The design of each metering element 30 results in stable control operation at all combinations of operating conditions, accurate control of fixed turbine bypass flow metering, and acceptable start transient control under all operating conditions. The metering elements of the present invention eliminate control oscillations, reduce 1 E vibration levels, and lessens the severity of internal turbomachinery wear mechanisms resulting in significant improvements in expander cycle control and in engine quality and producibility.

While it is preferred that there be three metering elements 30 in the housing 12, there may be, if desired, less than three or more than three metering elements 30.

It is apparent that there has been provided in accordance with the present invention a reduced gain thrust control valve which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A reduced gain thrust control valve for use in a rocket engine comprising:
    a housing having a fluid inlet;
    said fluid inlet having at least one metering element formed therein;
    said at least one metering element comprising first means for producing improved control stability, second means for controlling thrust during a start transient engine phase, and third means for accommodating a retainer; and
    a piston and cylinder unit for controlling a fluid output of said control valve.

2. A reduced gain thrust control valve according to claim 1, wherein said at least one metering element is machined into said housing.

3. A reduced gain thrust control valve according to claim 1, wherein said housing has a plurality of said metering elements machined therein.

4. A reduced gain thrust control valve according to claim 1, wherein said first means comprises a rectangular portion.

5. A reduced gain thrust control valve according to claim 1, wherein said second means comprises a tee and slot portion.

6. A reduced gain thrust control valve according to claim 1, wherein said third means comprises a fixed turbine bypass portion.

7. A reduced gain thrust control valve according to claim 1, wherein said fixed turbine bypass portion is always uncovered and used to compensate for engine to engine variations.

8. A reduced gain thrust control valve according to claim 1, further comprising:
    said housing having an opening and said retainer being positioned within said opening; and
    said retainer having at least one fluid channel therein.

9. A reduced gain thrust control valve according to claim 1, wherein said piston and cylinder unit comprises a piston and a cylinder which move axially with respect to said housing.

10. A reduced gain thrust control valve according to claim 8, wherein said piston and cylinder unit covers and uncovers said first and second means of said at least one metering element.

11. A metering element for use in a reduced gain thrust control valve for an engine comprising:
    a rectangular portion for providing control stability margin and a steady state operating range for said engine;
    a tee and slot portion for controlling thrust during an engine start transient;
    a fixed turbine bypass portion; and
    said fixed turbine bypass portion accommodating a retainer having at least one fluid channel so as to produce repeatable fixed bypass flow metering.

* * * * *